US012762236B2

(12) United States Patent
Sava et al.

(10) Patent No.: US 12,762,236 B2
(45) Date of Patent: Oct. 13, 2026

(54) TECHNIQUES FOR UTILIZING EMBEDDINGS TO MONITOR PROCESS TREES

(71) Applicant: CrowdStrike, Inc., Sunnyvale, CA (US)

(72) Inventors: Vasile-Daniel Sava, Vaslui (RO); Paul Sumedrea, Bucharest (RO); Cristian Viorel Popa, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 215 days.

(21) Appl. No.: 18/216,833

(22) Filed: Jun. 30, 2023

(65) Prior Publication Data

US 2025/0005154 A1 Jan. 2, 2025

(51) Int. Cl.
*G06F 21/56* (2013.01)

(52) U.S. Cl.
CPC .................................. *G06F 21/566* (2013.01)

(58) Field of Classification Search
CPC ............................................... G06F 21/56–568
See application file for complete search history.

(56) References Cited

U.S. PATENT DOCUMENTS

| | | | | |
|---|---|---|---|---|
| 2020/0167464 | A1* | 5/2020 | Griffin | G06F 21/563 |
| 2021/0406368 | A1* | 12/2021 | Agranonik | G06F 17/18 |
| 2022/0318377 | A1* | 10/2022 | Edwards | G06F 21/552 |
| 2024/0143746 | A1* | 5/2024 | Batta | G06F 21/554 |
| 2024/0330446 | A1* | 10/2024 | Bulut | G06N 3/045 |

FOREIGN PATENT DOCUMENTS

| | | | | |
|---|---|---|---|---|
| CN | 111191239 | A * | 4/2022 | G06F 21/56 |

* cited by examiner

*Primary Examiner* — Madhuri R Herzog
(74) *Attorney, Agent, or Firm* — Womble Bond Dickinson (US) LLP

(57) ABSTRACT

A process tree embedding is generated corresponding to a process tree. The process tree comprises a plurality of processes. The process tree embedding is processed with a machine learning model to generate an identification of malware associated with the process tree. In some embodiments, processing the process tree embedding with the machine learning model to generate the identification of malware associated with the process tree includes: processing the process tree embedding with the machine learning model to generate a classification of the process tree as being associated with malware; and, responsive to the classification indicating that the process tree is associated with malware, generating the identification of a first process of the plurality of processes that is relevant to the classification of the process tree as being associated with malware.

20 Claims, 10 Drawing Sheets

TECHNIQUES FOR UTILIZING EMBEDDINGS TO MONITOR PROCESS TREES

TECHNICAL FIELD

Aspects of the present disclosure relate to detecting cybersecurity events, and more particularly, to detecting cybersecurity events through analysis of process trees.

BACKGROUND

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., COM or EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware-detection or removal tools.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
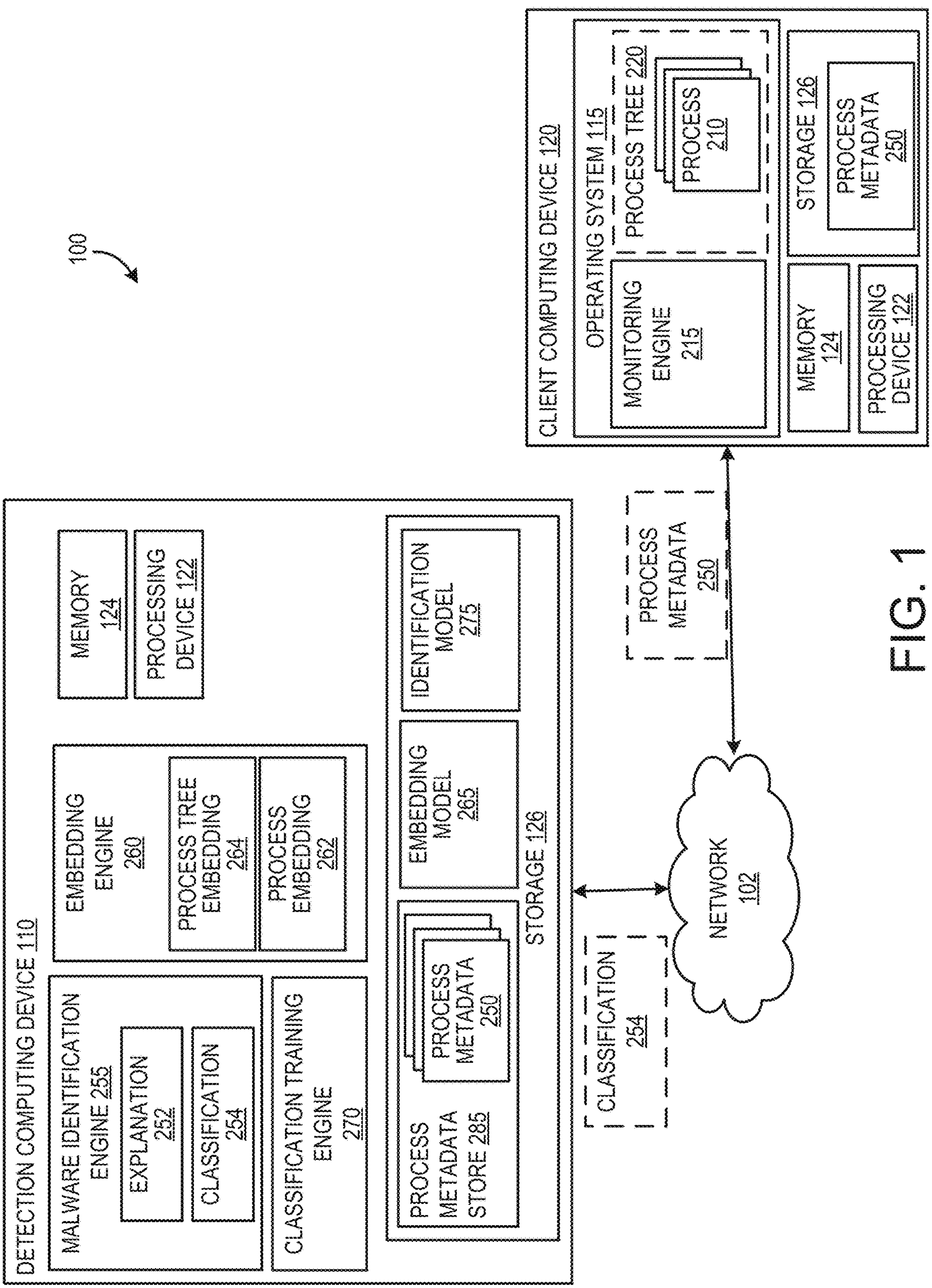
FIG. 1 is a block diagram that illustrates an example system, according to some embodiments of the present disclosure.

Modern computer systems are subject to a large number of potential malware attacks. Examples of malware include computer viruses, worms, Trojan horses, ransomware, rootkits, keyloggers, spyware, adware, rogue security software, potentially unwanted programs (PUPs), potentially unwanted applications (PUAs), and other malicious programs. To protect from such malware, users may install scanning programs which attempt to detect the presence of malware. These scanning programs may review programs and/or executables that exist on the computer's storage medium (e.g., a hard disk drive (HDD)) prior to execution of the file. However, authors and distributors of malware have taken countermeasures to avoid these scanning programs. In some cases, the malware is obfuscated to conceal the contents of the file. Obfuscation may include varying the contents of the file to misdirect, confuse, or otherwise conceal the true purpose and/or function of the code. For example, obfuscation may include inserting inoperable code within the executable instructions, compressing/encrypting the operating instructions, rearranging the code instructions, and/or other techniques. These techniques can make it difficult to identify malware in at-rest files.

Given the many ways that malware can be hidden, mechanisms that simply scan files to determine whether malware is present face difficult and ever-changing challenges. Recognizing the many variations that a particular version of malware can take may cause constant updates to a scanning program. To address some of these challenges, extended detection and response (XDR) techniques and capabilities have been developed to address malware XDR techniques attempt to combine the telemetry data from multiple tools into a cohesive whole, correlating the telemetry data to identify potential threats. In an XDR environment, threats may be identified by more than just a scan, but also by how the underlying executable behaves or the type of traffic it generates. XDR connects data from otherwise-isolated security solutions to improve threat visibility and reduce the length of time required to identify and respond to an attack. XDR enables advanced forensic investigation and threat hunting capabilities across multiple domains from a single administrative interface. XDR techniques may include ingesting and normalizing volumes of data from endpoints (e.g., client computing devices), cloud workloads, identity, email, network traffic, virtual containers and more. XDR techniques may then parse and correlate the data to automatically detect threats, and respond to the threats, potentially prioritized by severity, so that threat hunters can quickly analyze and triage new events. In some cases, XDR techniques may attempt to automate investigation and response activities As part of the operations of investigating potential malware, processes running on a client device may be analyzed. The processes may be organized within an operating system of the client device as a process tree. A process tree can be viewed as a graph that shows meaningful connections between processes. In analyzing a process tree, a whole call stack may be manually parsed to understand and explain certain behaviors. Depending on the size of the underlying process tree, manually parsing might prove unfeasible (e.g., for thousands of nodes), and unproductive, as usually an overview may be sufficient rather than dissecting each step in the execution.

In addition, for behavioral models of threat detection, analysts may have to tag data coming from events from the underlying devices. This often implies that the analysts have to parse through a large sample of events in order to get an accurate overview of an underlying computing environment. This task can prove to be very time consuming and difficult to scale.

The present disclosure addresses the above-noted and other deficiencies by providing an automated solution that can explain a process tree in natural language, to help analysts scale up operations and provide more informed answers to potential security events in a timely manner. Embodiments of the present disclosure provide an automated tool that can generate, in natural language, a high level explanation of the inner workings of a process tree. Embodiments of the present disclosure may reduce the amount of time and processing resources needed to identify a potential threat on a computing device.

In some embodiments, a self-supervised embedding model that leverages the power of said embeddings is used to train an identification model that can explain, in natural language, the details associated with a process tree. Some embodiments of the present disclosure may create embeddings at the process level, and then create embeddings at the process tree level from the process level embeddings. After the process tree representation has been constructed by training the self-supervised embedding, a mapping between process trees and explanations may be learned by leveraging various metadata (notes, patterns, tags) associated with the process trees as a supervision signal.

The embodiments described herein provide improvements over some security mechanisms which rely on the detection of particular patterns in stored files. In sharp contrast, the embedding model described herein may be capable of determining features of a process tree (e.g., metadata and/or structure associated with processes of the process tree) that are indicative of an executing process that contains malware. These features may be identified, in some cases, regardless of attempts by an author of the malware to change its data signature. In this way, embodiments according to the present disclosure may provide an improved capability of detecting malware, and may increase the security of a computer system.

FIG. 1 is a block diagram that illustrates an example system 100, according to some embodiments of the present disclosure. FIG. 1 and the other figures may use like reference numerals to identify like elements. A letter after a reference numeral, such as "250A," indicates that the text refers specifically to the element having that particular reference numeral. A reference numeral in the text without a following letter, such as "250," refers to all of the elements in the figures bearing that reference numeral.

As illustrated in FIG. 1, the system 100 includes a first computing device 110 (also referred to herein as a detection computing device 110) and a second computing device 120 (also referred to herein as a client computing device 120). The detection computing device 110 and the client computing device 120 may each include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

In some embodiments, memory 124 may be volatile memory that loses contents when the power to the computing device is removed or non-volatile memory that retains its contents when power is removed. In some embodiments, memory 124 may be non-uniform access (NUMA), such that memory access time depends on the memory location relative to processing device 122.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like. It should be noted that although, for simplicity, a single processing device 122 is depicted in the client computing device 120 and the detection computing device 110 depicted in FIG. 1, other embodiments of the client computing device 120 and/or the detection computing device 110 may include multiple processing devices, storage devices, or other devices.

The storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The detection computing device 110 and/or the client computing device 120 may comprise any suitable type of computing device or machine that has a programmable processor including, for example, server computers, desktop computers, laptop computers, tablet computers, smartphones, set-top boxes, etc. In some examples, the detection computing device 110 may comprise a single machine or may include multiple interconnected machines (e.g., multiple servers configured in a cluster). The detection computing device 110 and/or the client computing device 120 may be implemented by a common entity/organization or may be implemented by different entities/organizations.

The detection computing device 110 and/or the client computing device 120 may be coupled to each other (e.g., may be operatively coupled, communicatively coupled, may communicate data/messages with each other) via network 102. Network 102 may be a public network (e.g., the internet), a private network (e.g., a local area network (LAN) or wide area network (WAN)), or a combination thereof. In one embodiment, network 102 may include a wired or a wireless infrastructure, which may be provided by one or more wireless communications systems, such as a WIFI™ hotspot connected with the network 102 and/or a wireless carrier system that can be implemented using various data processing equipment, communication towers (e.g., cell towers), etc. The network 102 may carry communications (e.g., data, message, packets, frames, etc.) between the detection computing device 110 and/or the client computing device 120.

The client computing device 120 may execute an operating system 115. The operating system 115 of the client computing device 120 may manage the execution of other components (e.g., software, applications, etc.) and/or may manage access to the hardware (e.g., processors, memory, storage devices etc.) of the client computing device 120. Operating system 115 may be software to provide an interface between the computing hardware (e.g., processing device 122 and/or storage device 126) and applications running on the operating system 115.

Operating system 115 may include an OS kernel and a user space supporting the execution of one or more processes 210. The number of processes 210 illustrated in FIG. 1 are merely for purposes of explanation, and are not intended to limit the embodiments of the present disclosure. Operating system 115 may include several operating system functionalities, including but not limited to process management, hardware interfaces, access control and the like. Examples of operating systems 115 include WINDOWS™, LINUX™, ANDROID™, IOS™, and MACOS™. Though not expressly illustrated in FIG. 1, the detection computing device 110 may also include an operating system, which may, in some embodiments, be different than that of the operating system 115 of the client computing device 120.

As illustrated in FIG. 1, the client computing device 120 may execute (e.g., using processing device 122) the one or more processes 210. Process 210 may be a desktop application, a network application, a database application, or any other application that may be executed by the operating system 115. To be executed, the process 210 may be loaded from a process executable (e.g., in storage device 126) into memory 124. The process executable may be a file, for example, on the storage device 126 that contains executable instructions. The operating system 115 may allocate execution resources (e.g., processing device 122 and/or memory 124) to the process 210 (e.g., by a multi-tasking scheduler). The processing device 122 may execute the executable instructions of the process 210.

In some embodiments, the processes 210 may execute within a tree hierarchy. As will be described further herein, a first process 210 may spawn a second process 210, which may further spawn other processes 210. The hierarchical relationship of the processes 210 may be represented by a process tree 220. The process tree 220 may illustrate the parent-child relationships within the processes 210. A first process 210 that spawns a second process 210 may be referenced as the parent of the second process 210, and the second process 210 may be referenced as the child of the first process 210. Similarly, if the second process 210 spawns a third process 210, the first process 210 may be referenced as the grandparent of the third process 210, and so on.

The operating system 115 of the client computing device 110 may also execute a monitoring engine 215. The monitoring engine 215 may monitor the processes 210 executing on the client computing device 110. In some embodiments, the monitoring engine 215 may execute at an elevated authority. For example, the monitoring engine 215 may have administrative access that allows it to collect process metadata 250 for each of the processes 210 of a particular process tree 220. In some embodiments, the monitoring engine 215 may execute as part of, or an extension of, the operating system 115. As will be described further therein, the process metadata 250 may be provided to the detection computing device 110 to facilitate embodiments of the present disclosure.

Figure 2A:
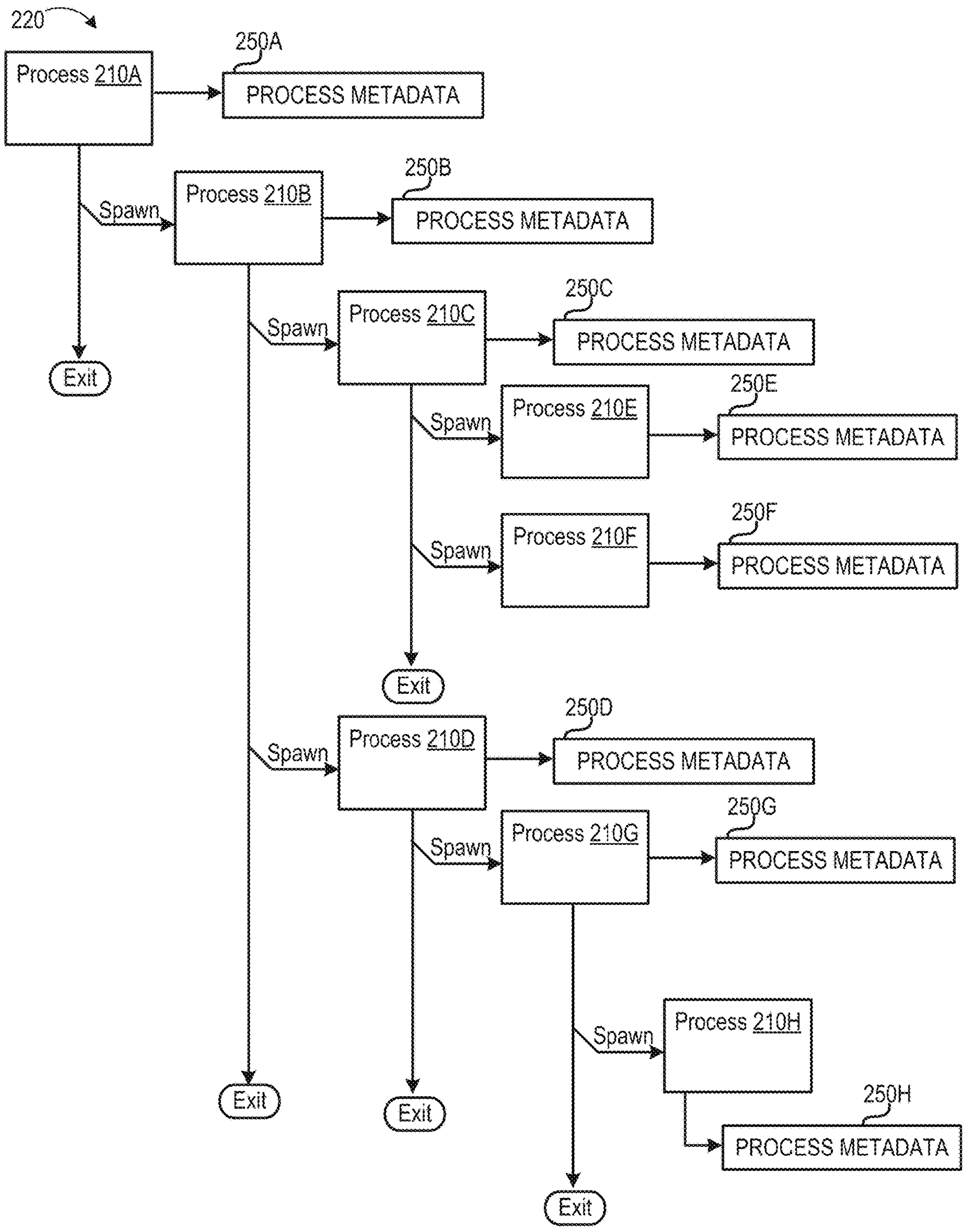
FIG. 2A is a schematic block diagram illustrating an example of a process tree, in accordance with some embodiments of the present disclosure.

FIG. 2A is a schematic block diagram illustrating an example of a process tree 220, in accordance with some embodiments of the present disclosure. A description of elements of FIG. 2A that have been previously described will be omitted for brevity. FIG. 2A provides additional details on the structure of the process tree 220.

As illustrated in FIG. 2A, the process tree 220 represents the execution of a plurality of processes 210 (e.g., within operating system 115) on a computing device, such as client computing device 120. In FIG. 2A, an example is illustrated in which eight processes (e.g., 210A, 210B, 210C, 210D, 210E, 210F, 210G, 210H) are shown in an example configuration of a process tree 220. The specific configuration of the processes 210 of the process tree 220 in the example of FIG. 2A is not intended to limit the embodiments of the present disclosure.

Referring to FIG. 2A, a first process 210A may execute (e.g., within operating system 115). During executing, the first process 210A may spawn a second process 210B. As used herein, spawn may refer to an operation in which one process 210 begins execution of another process 210. Though illustrated as a single operation in FIG. 2A, this is only for example. In some embodiments of an operating system 115, spawning a child process 210 may be accomplished by a plurality of operations.

For example, in operating systems supporting aspects of the Portable Operating System Interface (POSIX) standard, spawning a new process 210 may include first performing an operation typically called a fork, which creates a child process 210 as a copy of the parent process 210, including the instruction codes and memory space. In an operation implementing the fork process as a fork system call, the child process 210 may return from the system call in the same manner as the parent process 210 (e.g., within the copy of the parent instruction codes), and may continue executing from that point.

While the child process 210 may continue to execute in this manner, the child process 210 may replace the instruction codes of the parent process 210 with a new set of instruction codes. As an example from a POSIX-compliant operating system, these operations may include a system call often known as an exec. As used herein, an exec operation refers to a function in an operating system, and/or provided by a system call that interfaces with the operating system, that operates to replace the instruction space of a process 210 with a new set of instruction codes. An example of an exec operation in the LINUX operating system is an operation performed by the kernel in response to an execv( ) system call. Thus, in a POSIX-compliant operating system (though not limited to POSIX-compliant operating system), a parent process 210 that wishes to spawn a different program/application, will first perform a fork, and then the child process 210 may perform an exec of the different program/application.

Referring to FIG. 2A, the first process 210A may spawn the second process 210B. While the first process 210A is executing, the monitoring engine 215 may collect first process metadata 250A from the first process 210A. The first process metadata 250A may include a number of particular data values that correspond to information associated with the first process 210A.

The second process 210B may continue to execute after being spawned by the first process 210A. As with the first process 210A, the monitoring engine 215 may collect second process metadata 250B from the second process 210B. During execution, the second process 210B may spawn a third process 210C and a fourth process 210D. The third process 210C may spawn a fifth process 210E and a sixth process 210F. The fourth process 210D may execute a seventh process 210G, which may subsequently spawn an eighth process 210H.

Figure 2B:
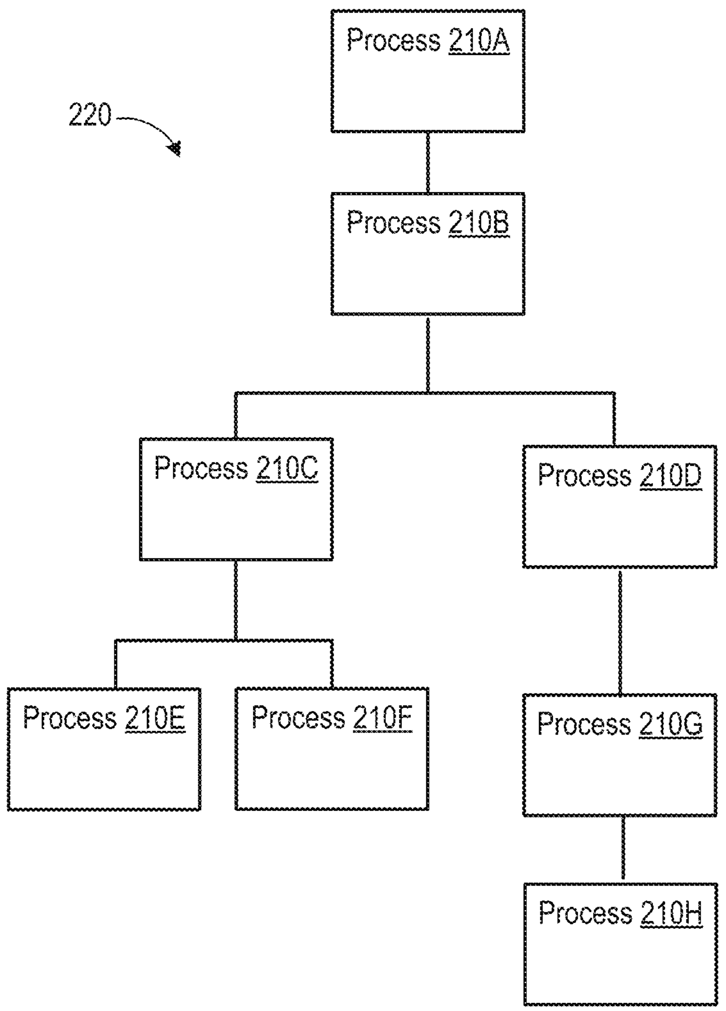
FIG. 2B illustrates a schematic representation of the process tree of FIG. 2A.

FIG. 2B illustrates a schematic representation of the process tree 220 of FIG. 2A. The process tree 220 illustrates the hierarchical nature of the process tree 220. For example, based on the example scenario of FIG. 2A, the first process 210A is the parent of the second process 210B. The second process 210B is the child of the first process 210A and the parent of the third process 210C and the fourth process 210D. The first process 210A is the grandparent of the third process 210C and the fourth process 210D. The fifth process 210E and the sixth process 210F are children of the third process 210C and grandchildren of the second process 210B. The seventh process 210G is the child of the fourth process 210D and the parent of the eighth process 210H. As used herein, processes 210 that are hierarchically above a target process 210 in the process tree 220 may be referred to as an ancestor of the target process 210. For example, in FIG. 2B, processes 210G, 210D, 210B, and 210A may be referred to as ancestors of process 210H.

In some embodiments, the process tree 220 may be viewed as a graph that provides information about the executions of the processes 210 within it and the connections between the processes 210. In some cases, analysis for malware may utilize the process tree 220 to detect potential fingerprints of harmful activity. Such analysis may examine a target process 210, its parent process 210, and its grandparent process 210. As an example utilizing FIG. 2B, analysis in a Windows operating system environment may detect the process 210H (see FIGS. 2A and 2B) that was executed having a command line of regsvr32.exe. Based on this, the parent process 210G of the target process 210H may be analyzed, which may be, for example, powershell.exe. The parent process 210D of powershell.exe may be analyzed, which may be, for example, wscript.exe, which may be determined to be malware that was executed by an infected application. By examining the process tree 220 of the a given suspect target process 210H, relevant process 210D (in this case, wscript.exe) may be detected which may be determined to be a relevant cause of the eventual execution of the target process 210H.

In some embodiments, similar types of malware may have similar process trees 220, even if the contents of the processes 210 change. For example, similar types of malware may be spawned in a similar series of operations. Embodiments of the present disclosure may collect information about the processes 210 and the structure of the process tree 220. This information may be analyzed to determine an operational state of the process tree 220 and, in some embodiments, determine whether a particular configuration of processes 210 of a process tree 220 may be associated with malware.

Referring back to FIG. 2A, to analyze the process tree 220, process metadata 250 may be collected for each of the processes 210. In some embodiments, the process metadata 250 may be collected by the monitoring engine 215. For example, first process metadata 250A may be collected for the first process 210A, second process metadata 250B may be collected for the second process 210B, third process metadata 250C may be collected for the third process 210C, fourth process metadata 250D may be collected for the fourth process 210D, fifth process metadata 250E may be collected for the fifth process 210E, sixth process metadata 250F may be collected for the sixth process 210F, seventh process metadata 250G may be collected for the seventh process 210G, and eighth process metadata 250H may be collected for the eighth process 210H.

In some embodiments, the process metadata 250 may be collected (e.g., by the monitoring engine 215) when the associated process 210 is spawned. In some embodiments, the process metadata 250 may be collected at particular operation points during the execution of the process 210. For example, process metadata 250 may be collected when the process 210 is first spawned. The process metadata 250 may be collected again and/or updated when other operations are performed by the process 210, such as a filesystem access, a screen capture, spawning another process, accessing a network, or other operation. For operating systems 115 that support fork and exec system calls, process metadata 250 may be collected when the process 210 is first forked and again when the process 210 performs an exec system call.

The process metadata 250 may include information related to the associated process 210. Examples of information of the process metadata 250 includes, but is not limited to an operating system process identifier (ID) of the process 210, a unique generated process ID (UPID) of the process 210 (UPIDs are described, for example, in U.S. patent application Ser. No. 18/081,144, filed on Dec. 14, 2022, and U.S. patent application Ser. No. 18/081,149, filed on Dec. 14, 2022), an operating system process ID of the parent of the process 210, a UPID of the parent of the process 210, an operating system process ID of the grandparent of the process 210, a UPID of the grandparent of the process 210, a filename (e.g., a full path) of an image (e.g., an executable process image stored in storage device 126) of the process 210, the command line used to create the process 210, the image filename of the parent process 210, the command line of the parent process 210, the image filename of the grandparent process 210, the command line of the grandparent process 210, an identification of the action that caused the generation of the process metadata 250 (e.g., the identification of the operation, such as an exec, a screenshot, access of the storage device 126, etc.), the name of the action that caused the generation of the process metadata 250, a uniform resource locator (URL) associated with the process 210, and the like. The provided list includes examples of process metadata 250, but is not intended to limit the embodiments of the present disclosure. Additional elements of process metadata 250 associated with a particular process 210 are contemplated.

Referring back to FIG. 1, the monitoring engine 215 may transmit the process metadata 250 to the detection computing device 110. For example, the monitoring engine 215 may transmit the process metadata 250 over the network 102 connecting the client computing device 120 to the detection computing device 110. The detection computing device 110 may utilize the process metadata 250 to analyze the process trees 220 of the client computing device 120.

For example, a malware identification engine 255 of the detection computing device 110 may analyze the process metadata 250 to determine a classification 254 and/or an explanation 252 associated with the process metadata 250. In some embodiments, the classification 254 may be a determination as to whether malware is present on the client computing device 120, where the malware is associated with the process metadata 250.

In some embodiments, the explanation 252 may be an identification of which process 210 or processes 210 of a given process tree 220 are associated with malware. In some embodiments, the explanation 252 may include an identification of which process 210 of the process tree 220 is most relevant in the determination of malware. For example, the explanation 252 may identify that a particular process 210 is performing harmful activities on the client computing device 120, but that another ancestor process 210 (e.g., a grandparent process 210 or great-grandparent process 210) is also infected and is likely the root cause of the malware. In some embodiments, the explanation 252 may be generated as natural language text suitable for display to a user, administrator, and/or analyst.

Figure 3:
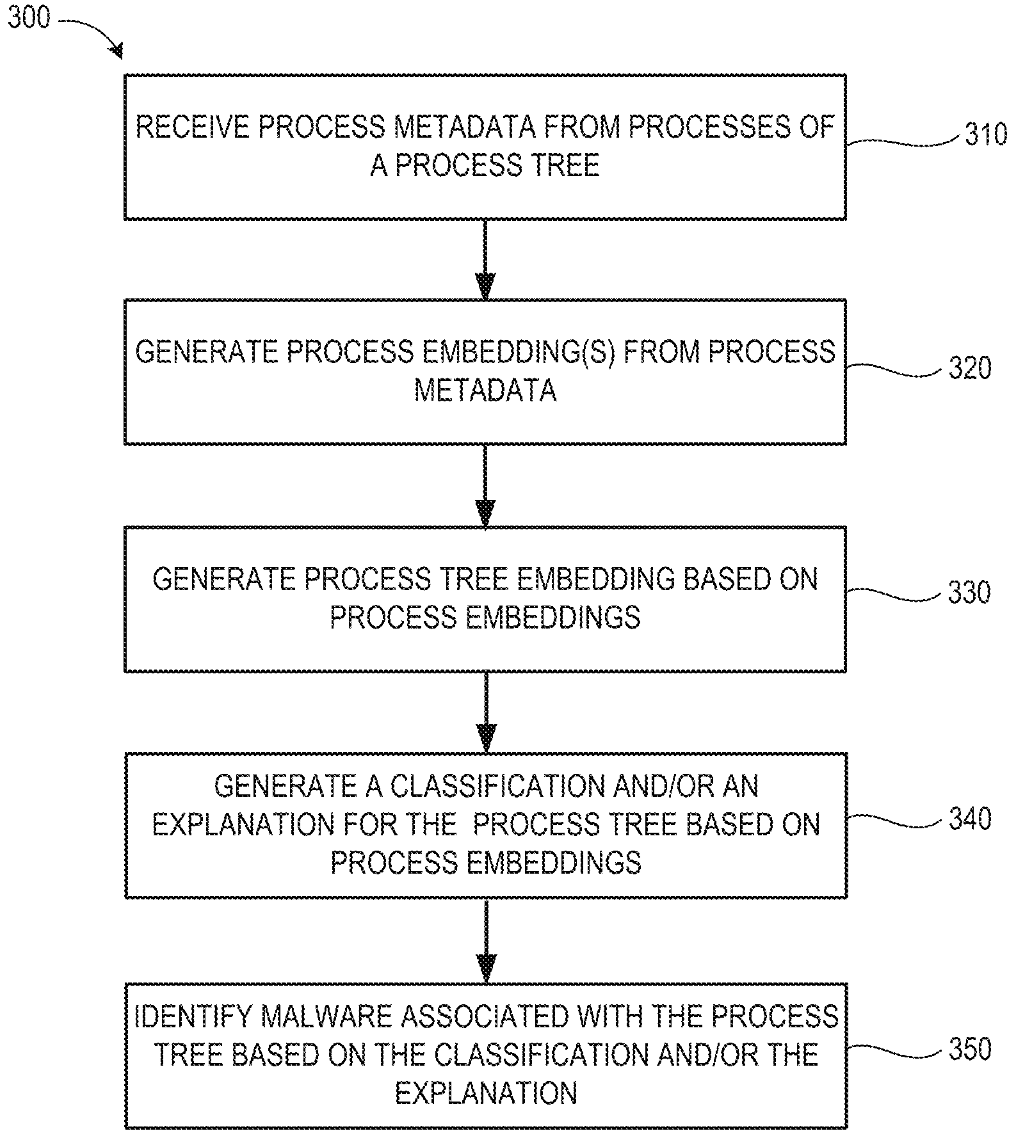
FIG. 3 is a flow diagram of a method of generating a malware classification and/or malware explanation, according to some embodiments of the present disclosure.

FIG. 3 is a flow diagram of a method 300 of generating a malware classification 254 and/or malware explanation 252, according to some embodiments of the present disclosure. A description of elements of FIG. 3 that have been previously described will be omitted for brevity. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., detection computing device 110).

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring simultaneously to FIG. 3 and FIGS. 1, 2A, and 2B as well, the method 300 begins at block 310, in which process metadata 250 is received from processes 210 of a process tree 220. As described herein, the process metadata 250 may be collected (e.g., from a client computing device 120) by a monitoring engine 215 and transmitted to the detection computing device 110 over the network 102. In some embodiments, the detection computing device 110 may store the process metadata 250 in a process metadata store 285 (e.g., in storage device 126).

At block 320, one or more process metadata 250 may be utilized to generate one or more process embeddings 262 from the process metadata 250. In some embodiments, the one or more process embeddings 262 may be generated by an embedding engine 260 (see FIG. 1) of the detection computing device 110.

The embedding engine 260 may be utilized generate embeddings for data, words, sentences, or documents. Embedding may refer to the process of taking a data element, such as a text-string and/or other data, and producing a vector of numbers for it. In other words, the original data element is "embedded" into the new multi-dimensional (embedding) space. The generated vectors (also referred to herein as embeddings) are not random/arbitrary. Instead, when entities are embedded, the points associated with the embeddings represented in the multi-dimensional space are close if the entities are similar and/or related.

Referring to FIG. 1, the embedding engine 260 may utilize an embedding model 265. In some embodiments, the embedding model 265 may be, or include a large language model (LLM), though the embodiments of the present disclosure are not limited to such a configuration. In some embodiments, the embedding model 265 may be a transformer-based neural network that is capable of managing tabular data. The embedding model 265 may be trained on vast amounts of text data using unsupervised learning techniques. During the training process, the embedding model 265 may learn, for example, to predict the next word in a sentence based on the context provided by the preceding words. Similarly, the embedding model 265 may learn during training of relationships between data in datasets, such as tabular data. This process enables the embedding model 265 to develop a rich understanding of the relationships between words and the contextual nuances of language and associated data.

In some embodiments, text utilized to train the embedding model 265 may include text available online, such as text on web pages, postings, and the like, but the embodiments of the present disclosure are not limited to such a configuration. In some embodiments, the embedding model 265 may be trained on process-specific contents, such as those included in operating systems 115. The embedding model 265 may maintain its training state, for example, in storage 126, which can be utilized when the embedding model 265 is operated.

Figure 4:
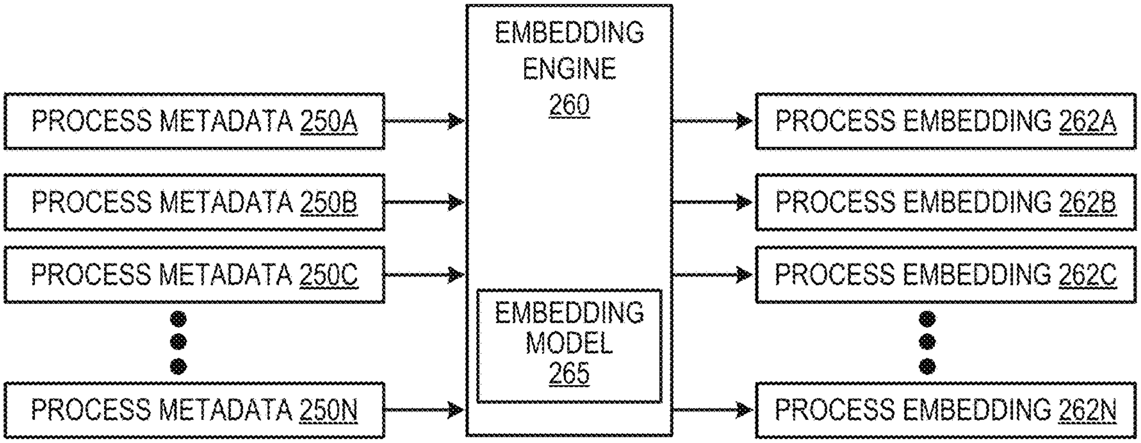
FIG. 4 is schematic block diagram illustrating an operation of the embedding engine to generate a process embedding, in accordance with some embodiments of the present disclosure.

FIG. 4 is schematic block diagram illustrating an operation of the embedding engine 260 to generate the process embedding 262, in accordance with some embodiments of the present disclosure. A description of elements of FIG. 4 that have been previously described will be omitted for brevity.

The embedding engine 260 may be configured to take as input the process metadata 250 and generate a corresponding process embedding 262. For example, the embedding engine 260 may process a first process metadata 250A and generate (e.g., utilizing the embedding model 265) a first process embedding 262A. In a similar manner, second, third, up to Nth process metadata 250B, 250C, . . . 250N may be processed by the embedding engine 260 to generate second, third, up to Nth process embeddings 262B, 262C, . . . 262N. The number of process metadata 250 and process embeddings 262 illustrated in FIG. 4 is merely an example, and is not intended to limit the embodiments of the present disclosure.

The generated process embeddings 262 for a given input of process metadata 250 are numerical representations (e.g., vectors) that encode semantic and syntactic properties of the language represented by the input. The process embeddings 262 may be high-dimensional vectors, where the dimensions capture different aspects of the language and/or data of the process metadata 250. The process embeddings 262 produced by the embedding engine 260 may have several desirable properties. First, the process embeddings 262 may capture semantic similarity, meaning that similar words or phrases are represented by vectors that are close to each other in the embedding space. For example, the embeddings of "dog" and "cat" would be closer together than the embeddings of "dog" and "car." This property allows for tasks like word similarity measurement or finding related words based on the vectors of the process embeddings 262.

Second, the process embeddings 262 may capture contextual information. Since the embedding model 265 is trained on vast amounts of data and/or text, it may programmatically learn to understand the meaning of data and/or words based on their surrounding context. This enables the process embeddings 262 to reflect the meaning of data within the process metadata 250. Furthermore, the embedding engine 260 may generate process embeddings 262 by aggregating the embeddings of individual portions of the process metadata 250. This allows for understanding the overall meaning and semantic compositionality of longer metadata portions.

The embedding engine 260 of the detection computing device 110 may generate a process embedding 262 for each of the process metadata 250 and store the results in the storage device 126. As will be described further herein, the process embeddings 262 may be utilized to classify potential malware executing on the client computing device 120.

Referring back to FIG. 3, the operations of the method 300 may continue with block 330, in which a process tree embedding 264 is generated based on the process embeddings 262. To generate the process tree embedding 264, the embedding engine 260 may aggregate and/or combine the process embeddings 262 associated with a given process tree 220.

Figure 5:
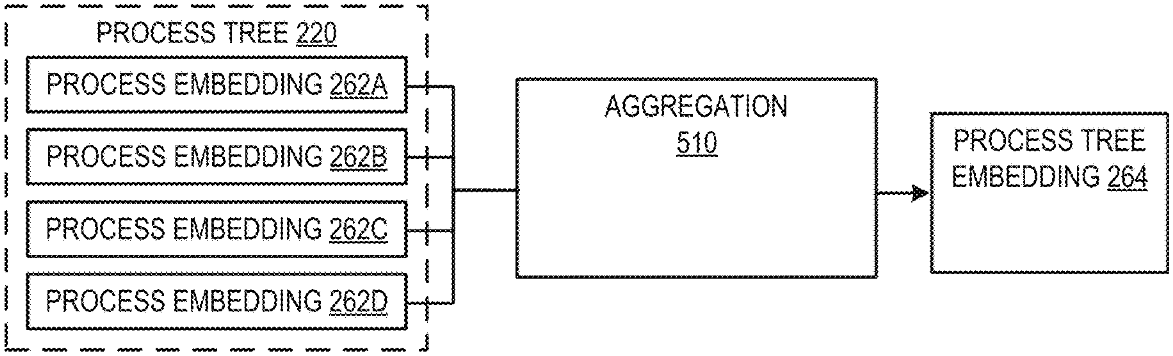
FIG. 5 is schematic block diagram illustrating an operation of generating a process tree embedding, in accordance with some embodiments of the present disclosure.

FIG. 5 is schematic block diagram illustrating an operation of generating a process tree embedding 264, in accordance with some embodiments of the present disclosure. A description of elements of FIG. 5 that have been previously described will be omitted for brevity.

Referring to FIG. 5, to generate the process tree embedding 264 for a particular process tree 220, the process embeddings 262 that are associated with the processes 210 of the process tree 220 may be aggregated and/or combined. For example, in FIG. 5, an example is illustrated in which four process embeddings 262 (262A, 262B, 262C, 262D) are aggregated for a particular process tree 220. The process embeddings 262A, 262B, 262C, 262D may be associated with the processes 210 of the process tree 220 (e.g., as executed on the operating system 115 of the client computing device 120, as illustrated in FIGS. 1, 2A, and 2B).

The process embeddings 262A, 262B, 262C, 262D may be processed by an aggregation operation 510. In some embodiments, the aggregation operation 510 may perform neighborhood aggregation on the various vectors of the process embeddings 262 associated with the process tree 220. The aggregation operation 510 may be performed in a variety of different ways. For example, in some embodiments, the process tree embedding 264 may be constructed by performing an averaging of the coordinates of the vectors of the process embeddings 262 (e.g., the process embeddings 262A, 262B, 262C, 262D) associated with the process tree 220. This is merely an example, and other forms of the aggregation operation 510 may be utilized without deviating from the embodiments of the present disclosure. For example, in some embodiments, the coordinates of the vectors of the process embeddings 262 may be summed to generate the process tree embedding 264. In some embodiments, the process tree embedding 264 may be formed by taking the maximum value for each coordinate of the respective vectors of the process embeddings 262. Other forms of combining the process embeddings 262 to generate the process tree embedding 264 are contemplated. For example, in some embodiments, the process embeddings 262 may be combined using a machine learning model, such as a neural network. For example, the machine learning model may be trained based on known combinations of processes 210 and/or process trees 220 to aggregate the various coordinates of the vectors comprising the process embeddings 262 to generate the process tree embedding 264.

Referring back to FIG. 3 and FIG. 1, the operations of the method 300 may continue with operation 340, in which a classification 254 and/or explanation 252 for the process tree 220 are generated based on the process tree embedding 264. In some embodiments, the classification 254 and/or the explanation 252 may be generated by a malware identification engine 255 of the detection computing device 110.

Figure 6:
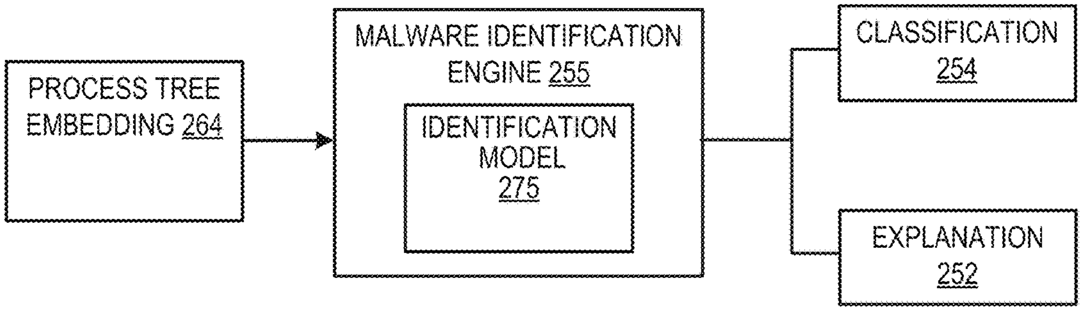
FIG. 6 is schematic block diagram illustrating an operation of generating a malware classification and/or malware explanation, in accordance with some embodiments of the present disclosure.

FIG. 6 is schematic block diagram illustrating an operation of generating a malware classification 254 and/or malware explanation 252, in accordance with some embodiments of the present disclosure. A description of elements of FIG. 6 that have been previously described will be omitted for brevity.

The classification 254 may provide a determination as to whether the process tree 220 is associated with malware, or other negative operating environment. Referring to both FIG. 6 and FIG. 1, to generate the classification 254, the process tree embedding 264 may be processed by the malware identification engine 255. In some embodiments, the malware identification engine 255 may process the process tree embedding 264 utilizing an identification model 275. In some embodiments, the identification model 275 may be a neural network model based on machine learning.

In some embodiments, the malware identification engine 255 may also generate an explanation 252. The explanation 252 may be an identification of which processes 210 of the process tree 220 are relevant in the determination of the malware classification 254. For example, the malware identification engine 255 may determine that a process tree embedding 264 is associated with malware. Thus, the classification 254 may identify that a particular process tree 220 is associated with malware, and the explanation 252 may identify why the process tree 220 is associated with malware, and the relevant portions of the process tree 220 (e.g., which processes 210) that contributed to the classification 254. In some embodiments, the explanation 252 may also be generated based on the identification model 275.

Referring to FIG. 6, the malware identification engine 255 may take the process tree embedding 264 as input. The malware identification engine 255 may analyze the process tree embedding 264 utilizing the identification model 275. The identification model 275 may be a machine learning model trained on a plurality of process tree embeddings 264. Each of the process tree embeddings 264 may have a known classification 254 and a known explanation 252. By processing the plurality of process tree embeddings 264 (including their known classifications 254 and known explanation 252) through machine learning, relationships may be established between different aspects of the process tree embeddings 264 and the classifications 254 and/or explanations 252 to generate the identification model 275.

Figure 7A:
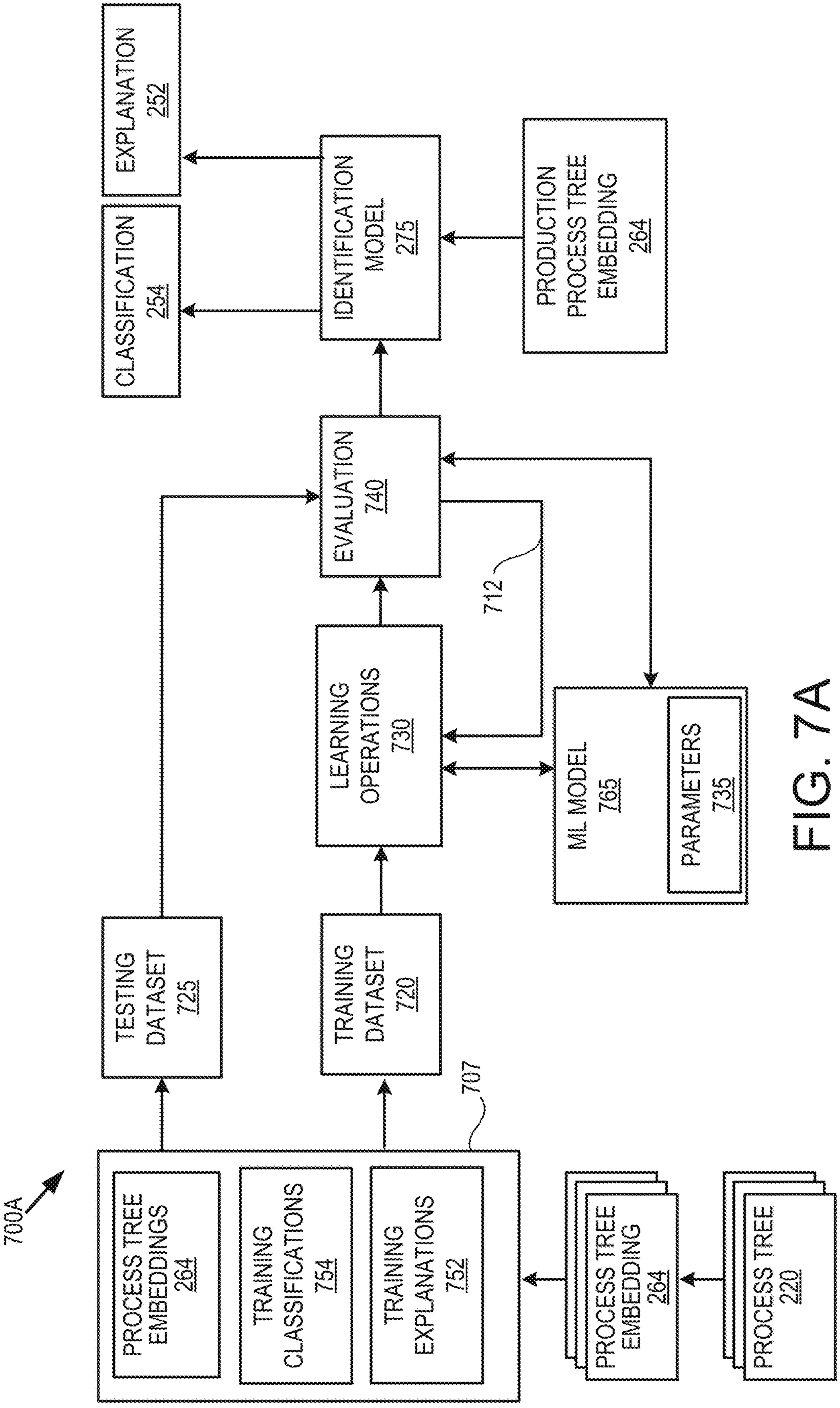
FIG. 7A is a block diagram illustrating an example training system for performing a machine learning operation based on process tree embeddings from process metadata, according to some embodiments of the present disclosure.

FIG. 7A is a block diagram illustrating an example training system for performing a machine learning operation based on process tree embeddings 264 from process metadata 250, according to some embodiments of the present disclosure. A description of elements of FIG. 7A that have been previously described will be omitted for brevity.

Referring to FIGS. 1 and 7A, a system 700A for performing a machine learning operation may include learning operations 730 which perform a feedback controlled comparison between a training dataset 720 and a testing dataset 725 based on the process tree embeddings 264. In some embodiments, the system 700A may be implemented by a classification training engine 270 of the detection computing device 110, as illustrated in FIG. 1. However, the embodiments of the present disclosure are not limited to such a configuration. In some embodiments, an identification model 275 may be pre-trained and provided to the detection computing device 110.

In some embodiments, the process tree embeddings 264, generated from the process metadata 250 as described herein, may be combined with training classification value 754 and/or training explanation value 752 to generate process tree-specific input data 707. More specifically, the process tree embeddings 264 from a particular process tree 220 may be combined with training classification value 754 and/or training explanation value 752 for the same process tree 220. The training classification value 754 for the process tree 220 may identify whether the process tree 220 contains or is associated with malware, and the training explanation value 752 for the process tree 220 may identify the underlying basis for the malware classification and which of the processes 210 of the process tree 220 are most relevant to the malware classification. In some embodiments, as part of training the identification model 275, particular process trees 220 with known classifications (e.g., it is known whether the process tree 220 contains or is associated with malware) may be collected and process tree embeddings 264 may be formed from process metadata 250 associated with processes 210 of the process tree 220 with known malware classifications and/or known explanations for the malware. The known classification and the known explanation of a given process tree 220 may be used as the training classification value 754 and/or the training explanation value 752, and combined with the process tree embedding 264 to form the process tree-specific input data 707 for that process tree 220.

In some embodiments, process metadata 250 may be collected from a process 210 that is part of a process tree 220 that is known to contain or be associated with malware. Thus, a training classification value 754 of the known-bad process tree 220 may be generated indicating that the process tree 220 is associated with malware and a training explanation value 752 of the known-bad process tree 220 may be generated identifying which portion of the process tree 220 is contributing to the training classification value 754. A set of process tree embeddings 264 may be generated from the process metadata 250 (as described herein with respect to FIGS. 4 and 5). The set of process tree embeddings 264 may be combined with the training classification value 754 (e.g., malware) and/or the training explanation value 752 to generate the process tree-specific input data 707 for that process tree 220.

Similarly, process metadata 250 may be collected from processes 210 of a process tree 220 that is known to be free of malware. Thus, a training classification value 754 and/or a training explanation value 752 of the known-good process tree 220 may be generated indicating that the process tree 220 is free of malware. A process tree embedding 264 may be generated from the processes 210 of the process tree 220 as described herein. The process tree embedding 264 may be combined with a training classification value 754 (e.g., malware-free) and/or a training explanation value 752 to generate the process tree-specific input data 707 for that process tree 220.

In this way, process tree-specific input data 707 may be generated for each process tree 220 used for training the identification model 275. The process tree-specific input data 707 may be separated into two groups: a training dataset 720 and a testing dataset 725. Each group of the training dataset 720 and the testing dataset 725 may include process tree-specific input data 707 (e.g., process tree embeddings 264 and their associated training classification value 754 and/or associated training explanation value 752) for a plurality of process trees 220.

Learning operation 730 may be performed on the training dataset 720. The learning operations 730 may examine the process tree embeddings 264 to establish a relationship between the elements of the process tree embeddings 264 that accurately predict the classification value 754 (e.g., malware or not malware) and/or the explanation value 752 for a given process tree 220. The learning operations 730 may generate a ML training model 765 that represents the determined relationship. The ML training model 765 may take a process tree embedding 264 as input, and output a classification value (e.g., malware or non-malware) and/or the explanation value for the process tree 220 associated with the process tree embedding 264. The learning operations 730 may attempt to adjust parameters 735 of the ML training model 765 to generate a best-fit algorithm that describes a relationship between the process tree embedding 264 and the training classification value 754 and/or the training explanation value 752 for all of the process trees 220 of the training dataset 720. A set of parameters 735 may be selected based on the training dataset 720 and preliminarily established as the ML training model 765.

The results of the learning operations 730 may be provided to an evaluation operation 740. The evaluation operation 740 may utilize the ML training model 765 generated by the learning operations 730 (based on the training dataset 720) to see if the ML training model 765 correctly predicts the training classification value 754 and/or the training explanation value 752 for the process tree embeddings 264 of the testing dataset 725. If the ML training model 765 accurately predicts the training classification values 754 and/or the training explanation values 752 of the testing dataset 725, it may be promoted to the identification model 275. If the ML training model 765 does not accurately predict the training classification values 754 and/or the training explanation values 752 of the testing dataset 725, feedback 712 may be provided to the learning operations 730, and the learning operations 730 may be repeated, with additional adjustment of the parameters 735. This process of learning operations 730 and evaluation operation 740 may be repeated until an acceptable identification model 275 is generated that is capable of accurately predicting the training classification values 754, the training explanation values 752, and/or combinations of the training classification values 754 and the training explanation values 752.

Once the identification model 275 is generated, it may be used to predict classifications 254 and/or explanations 252 for production process tree embeddings 264. For example, for a given process 210, process metadata 250 may be generated, as described herein. A process tree embedding 264 may be generated in a manner similar to that discussed herein (e.g., with respect to FIGS. 4 and 5). For example, a process embedding 262 may be generated for each process 210 of a process tree 220, and the process tree embedding 264 may be generated from the process embeddings 262.

As illustrated in FIG. 7A, the process tree embedding 264 may be provided to the identification model 275. The operations of the identification model 275 may generate the classification 254 (e.g., whether or not the process tree 220 associated with the production process tree embedding 264 contains and/or is associated with malware) and/or the explanation 252 (e.g., which processes 210 of the process tree 220 are relevant to the classification of the process tree 220).

Figure 7B:
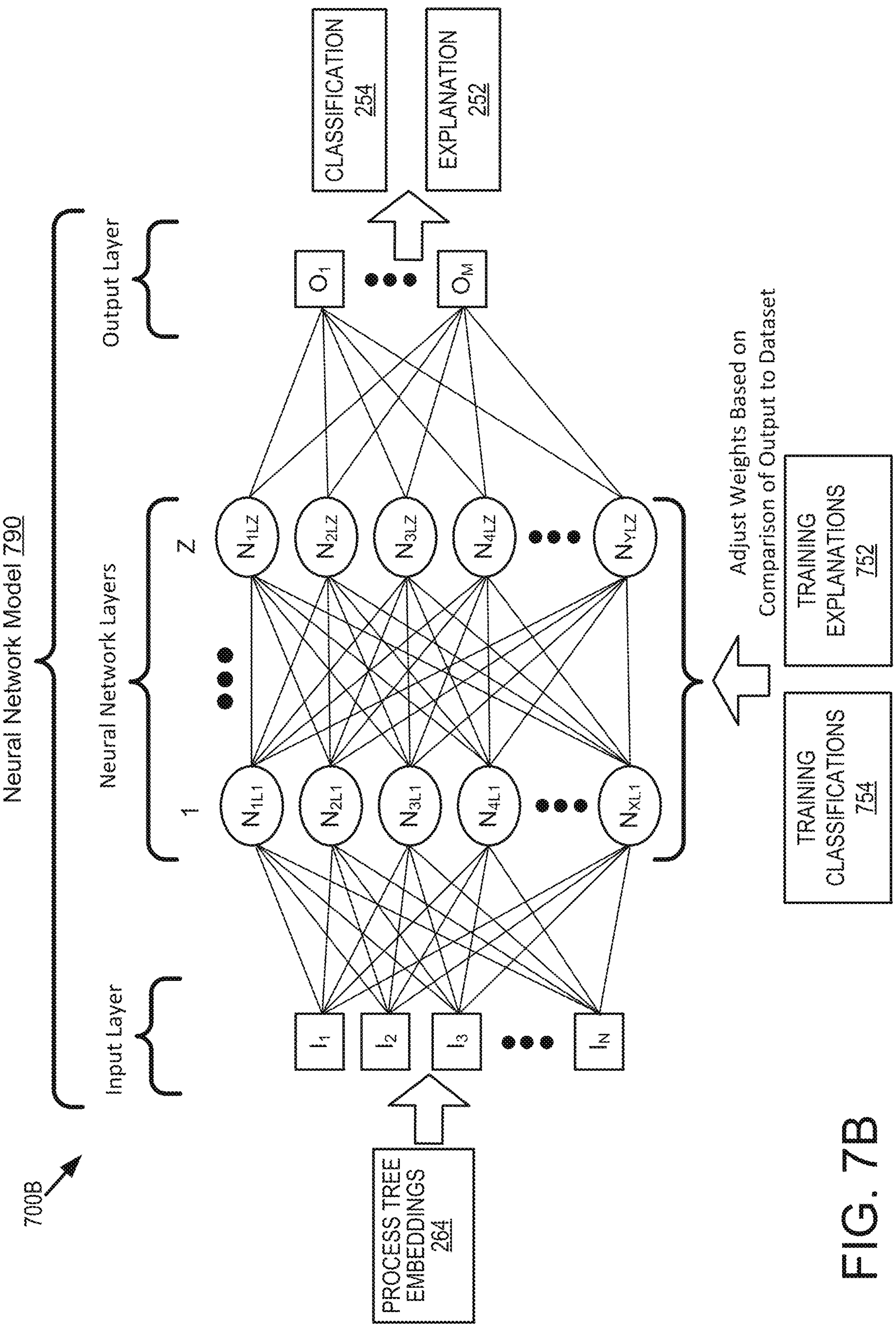
FIG. 7B is a block diagram of a system incorporating a neural network model for generating a classification and/or explanation of a process tree embedding based on process metadata, according to some embodiments of the present disclosure.

FIG. 7B is a block diagram of a system 700B incorporating a neural network model 790 for generating a classification 254 and/or an explanation 252 of a process tree embedding 264 based on process metadata 250, according to some embodiments of the present disclosure. In some embodiments, the system 700B may be implemented by the classification training engine 270 of the detection computing device 110, as illustrated in FIG. 1. However, the embodiments of the present disclosure are not limited to such a configuration. In some embodiments, the neural network model 790 may be pre-trained and provided as the identification model 275 to the detection computing device 110.

Referring to FIG. 7B, the neural network model 790 includes an input layer having a plurality of input nodes $I_1$ to $I_N$, a sequence of neural network layers (layers 1 to Z are illustrated in FIG. 7B) each including a plurality (e.g., 1 to X in FIG. 7B) of weight nodes, and an output layer including at least one output node. In the particular non-limiting example of FIG. 7B, the input layer includes input nodes $I_1$ to $I_N$ (where N is any plural integer). A first one of the sequence of neural network layers includes weight nodes $N_{1L1}$ (where "1L1" refers to a first weight node on layer one) to $N_{XL1}$ (where X is any plural integer). A last one ("Z") of the sequence of neural network layers includes weight nodes $N_{1LZ}$ (where Z is any plural integer) to $N_{YLZ}$ (where Y is any plural integer). The output layer includes a plurality of output nodes O1 to $O_M$ (where M is any plural integer).

The neural network model 790 can be operated to process elements of the process tree embedding 264 through different inputs (e.g., input nodes $I_1$ to $I_N$) to generate one or more outputs (e.g., output nodes O1 to $O_M$). The elements of the process tree embedding 264 that can be simultaneously processed through different input nodes $I_1$ to $I_N$ may include, for example, statistical values (e.g., minimum, maximum, average, and/or standard deviation) of axes of an embedding space based the process tree embedding 264. The classification 254 and/or the explanation 252 that can be output (e.g., through output nodes O1 to $O_M$) may include an indication of whether the process tree 220 associated with the process tree embedding 264 is associated with malware and/or the processes 210 of the process tree 220 that may contribute to that classification.

During operation and/or training of the neural network model 790, the various weights of the neural network layers may be adjusted based on a comparison of predicted process classification 254 and/or predicted explanation 252 to data of an actual classification and/or explanation (such as training classification value 754 and/or training explanation value 752). The comparison may be performed, for example, through the use of a loss function. The loss function may provide a mechanism to calculate how poorly the training model is performing by comparing what the model is predicting with the actual value it is supposed to output. The interconnected structure between the input nodes, the weight nodes of the neural network layers, and the output nodes may cause a given element of the process tree embedding 264 to influence the classification prediction 254 and/or the explanation prediction 252 generated for all of the other elements of the process tree embedding 264 that are simultaneously processed. The classification prediction 254 and/or the explanation prediction 252 generated by the neural network model 790 may thereby identify a comparative prioritization of which of the elements of the process tree embedding 264 provide a higher/lower impact on the classification 254 as to whether the associated process tree 220 is, or is not, associated with malware and/or the explanation prediction 252 as to which processes 210 of the process tree 220 contribute to that classification 254.

The neural network model 790 of FIG. 7B is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of input values that are to be simultaneously processed, and the number of output nodes can be similarly selected based on the number of output characteristics that are to be simultaneously generated therefrom.

Referring back to FIG. 3, at block 350, once the classification 254 and/or explanation 252 have been generated, an identification of malware may be made based on the classification 254 and/or explanation 252. For example, if the classification 254 indicates that the process tree 220 is associated with malware, the explanation 252 may be utilized to identify a process 210 of the process tree 220 that is relevant to the classification of malware. The identification of the process 210 relevant to the classification of malware for the process tree 220 may allow for remediation actions to be taken with respect to the relevant process 210.

The method 300 illustrates that process embeddings 262 may be generated from process metadata 250, and the process tree embeddings 264 may be generated from the process embeddings 262. However, the embodiments of the present disclosure are not limited to such a configuration.

Figure 8:
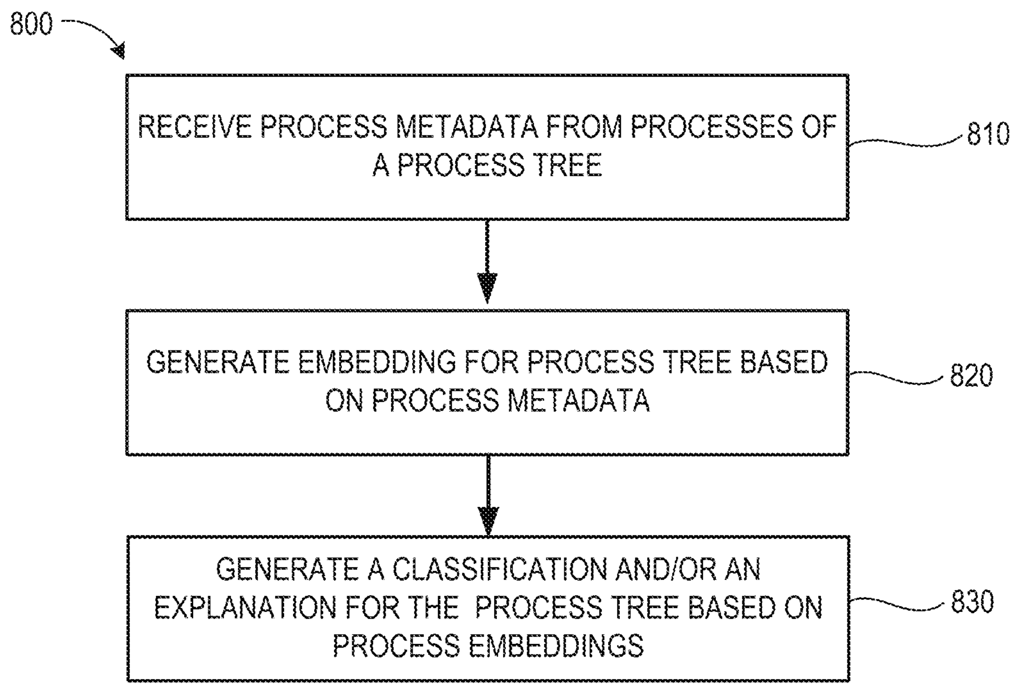
FIG. 8 is a flow diagram of another method of generating a malware classification and/or malware explanation, according to some embodiments of the present disclosure.

FIG. 8 is a flow diagram of another method 800 of generating a malware classification 254 and/or malware explanation 252, according to some embodiments of the present disclosure. A description of elements of FIG. 8 that have been previously described will be omitted for brevity. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by a computing device (e.g., detection computing device 110).

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Referring to FIG. 8, as well as the prior figures, the method 800 begins at block 810, in which process metadata 250 is received from processes 210 of a process tree 220. The receipt of the process metadata 250 may be similar to the block 310 described herein with respect to FIG. 3 and, as such, a duplicate description thereof will be omitted.

As operation 820, a process tree embedding 264 is generated based on the process metadata 250. To generate the process tree embedding 264, the embedding engine 260 may take as input the process metadata 250. Operation 820 may generate the process tree embedding 264 directly from the process metadata 250, rather than generating the intermediate process embeddings 262, as described herein with respect to FIG. 3.

Figure 9:
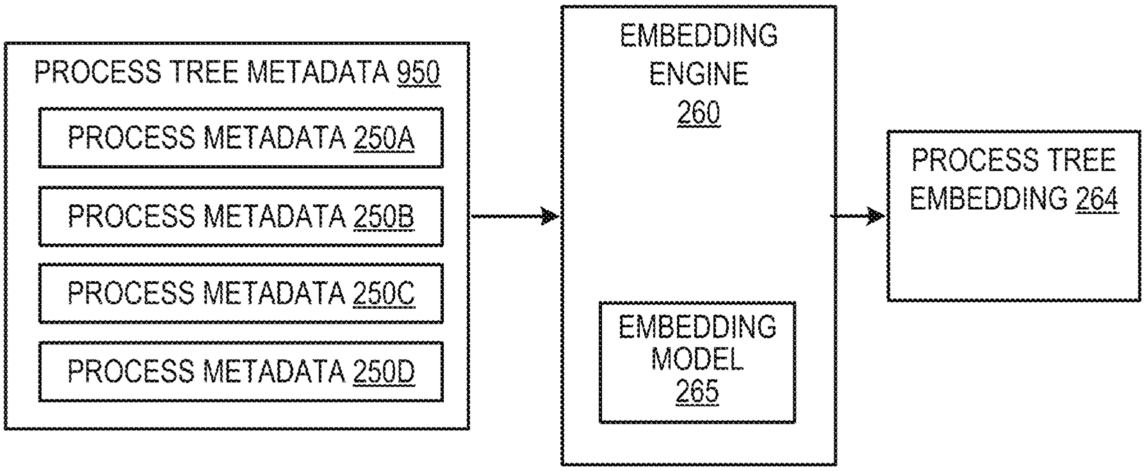
FIG. 9 is schematic block diagram illustrating an operation of generating a process tree embedding from process metadata, in accordance with some embodiments of the present disclosure.

FIG. 9 is schematic block diagram illustrating an operation of generating a process tree embedding 264 from process metadata 250, in accordance with some embodiments of the present disclosure. A description of elements of FIG. 9 that have been previously described will be omitted for brevity.

Referring to FIG. 9, to generate the process tree embedding 264 for a particular process tree 220, the process embeddings 262 that are associated with the processes 210 of the process tree 220 may be provided to the embedding engine 260. For example, in FIG. 5, an example is illustrated in which four process metadata 250 (250A, 250B, 250C, 250D) are collected for a particular process tree 220. The process metadata 250A, 250B, 250C, 250D may be processed by the embedding engine 260 to generate the process tree embedding 264. As previously described, the generated process tree embedding 264 for a given set of process metadata 250 is a numerical representation that encodes semantic and syntactic properties of the language represented by the input (e.g., the process metadata 250).

In the method 800, the process tree embedding 264 may be directly generated from the process metadata 250. In some embodiments, the process metadata 250 may be concatenated or otherwise combined when provided to the embedding engine 260. In some embodiments, additional process tree metadata 950 may be provided to the embedding engine 260 along with the process metadata 250. The process tree metadata 950 may include information related to the process tree 220, such as the number of processes 210, details on the execution history of the process tree 220, tags associated with the process tree 220, statistics associated with the process tree 220, and the like. In some embodiments, the process tree metadata 950 may be omitted.

Referring back to FIG. 8 and FIG. 1, the operations of the method 800 may continue with operation 839, in which a classification 254 and/or explanation 252 for the process tree 220 are generated based on the process tree embedding 264. In some embodiments, the classification 254 and/or the explanation 252 may be generated by a malware identification engine 255 of the detection computing device 110. The generation of the classification 254 and/or explanation 252 for the process tree 220 may be similar to the block 340 described herein with respect to FIG. 3 and, as such, a duplicate description thereof will be omitted.

The method 800 of FIG. 8 may allow for the generation of the process tree embedding 264 directly from the process metadata 250, as compared to the method 300 of FIG. 3. As a result, the classification 254 and/or explanation 252 may be generated more quickly and with the use of fewer resources. In addition, by providing the process metadata 250 for all of the processes 210 at once, it may be possible for the embedding engine 260 to extract additional context from the process tree 220, which may lead to a more accurate classification 254 and/or explanation 252.

Referring back to FIG. 1, once generated the classification 254 and/or the explanation 252 may be utilized to detect and/or remediate malware. For example, in some embodiments, responsive to the classification 254 and/or the explanation 252 indicating that process tree 220 is associated with malware, steps may be taken to isolate the processes 210 of the process tree 220. In some embodiments, for example, the classification 254 (and/or explanation 252) may be transmitted to the client computing device 120. The client computing device 120 may take remediation to address any malware that may be indicated by the explanation 252. For example, if the classification 254 indicates that one or more processes 210 of a process tree 220 executing on the client computing device 120 are associated with malware, the one or more processes 210 may be terminated and/or quarantined. For example, in response to determining that a process 210 is, or is associated with, malware, the operating system 115 (and/or the monitoring engine 215) may terminate and/or unload the process 210 (or all of the processes 210 of the process tree 220), deny the program executable associated with the process 210 permission to execute from memory 124, and/or deny the process 210 access to resources of the client computing device 120. In some embodiments, responsive to the classification 254 and/or explanation 252 indicating malware, an alert may be transmitted from the detection computing device 110 (e.g., to the client computing device 120 and/or another administrative computing device).

The system 100 provides an improvement in the technology associated with computer security. For example, the system 100 provides an improved malware detection platform that is able to holistically analyze a process tree 220 to determine if the process tree 220 is associated with malware, as well as determining which processes 210 of the process tree 220 are contributing to this determination. The system 100 is a technological improvement over some techniques for malware detection in that it does not exclusively utilize static image comparisons, which may be quickly varied by malware developers. Instead, embodiments according to the present disclosure may identify malware based on characteristics of portions of the running processes associated with the malware, and may be able to bypass obfuscation techniques that might otherwise make the malware detection difficult.

In FIG. 1, the embedding model 265 and the identification model 275 are illustrated as separate models. However, the embodiments of the present disclosure are not limited to such a configuration. In some embodiments, the embedding model 265 and the identification model 275 may be different portions of a single machine learning-based model.

Figure 10:
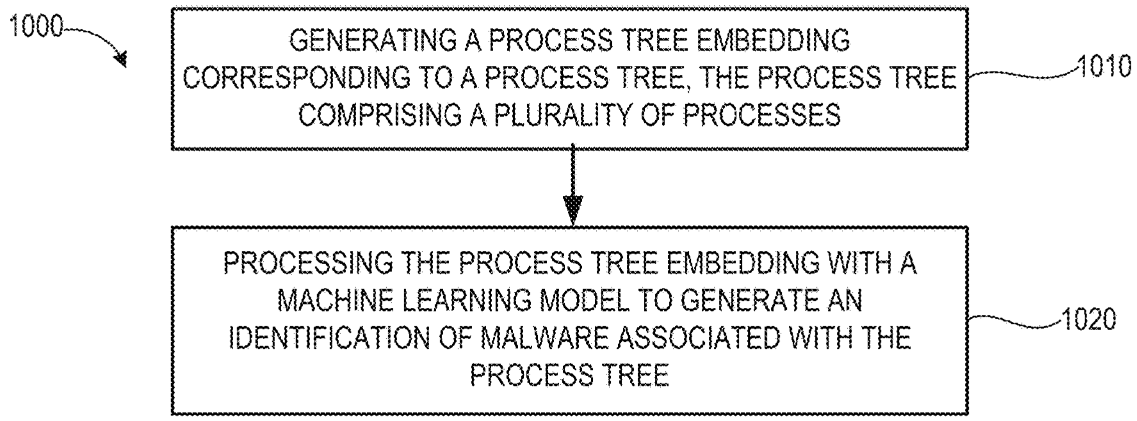
FIG. 10 is a flow diagram of a method of operating a malware detection system, according to some embodiments of the present disclosure.

FIG. 10 is a flow diagram of a method 1000 of operating a malware detection system, in accordance with some embodiments of the present disclosure. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1000 may be performed by a computing device (e.g., detection computing device 110).

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Referring simultaneously to the prior figures as well, the method 1000 begins at block 1010, which includes generating a process tree embedding corresponding to a process tree, the process tree comprising a plurality of processes. In some embodiments, the process tree embedding and process tree may be similar to the process tree embedding 264 and/or the process tree 220 described herein with respect to FIGS. 1 to 9. In some embodiments, the plurality of processes may be similar to the processes 210 described herein with respect to FIGS. 1 to 9. In some embodiments, generating the process tree embedding corresponding to the process tree includes generating a process embedding corresponding to a first process of the process tree, and generating the process tree embedding based on the process embedding. In some embodiments, the process embedding may be similar to the process embedding 262 described herein with respect to FIGS. 1 to 9.

In some embodiments, generating the process embedding comprises submitting metadata associated with the first process to an LLM. In some embodiments, the metadata may be similar to the process metadata 250 described herein with respect to FIGS. 1 to 9. In some embodiments, the metadata includes at least one of an operating system process identifier (ID) of the first process, a unique generated process ID (UPID) of first process, an operating system process ID of an ancestor in the process tree of first process, a UPID of the ancestor in the process tree of the first process, a filename of an executable image of the first process, a command line used to create the first process, a filename of an executable image of the ancestor in the process tree of the first process, a command line of the ancestor in the process tree of the first process, or an identification of an action that caused a generation of the metadata for the first process.

In some embodiments, generating the process tree embedding corresponding to the process tree includes generating process embeddings for each of the plurality of processes of the process tree, and aggregating the process embeddings to generate the process tree embedding.

In some embodiments, generating the process tree embedding corresponding to the process tree includes generating the process tree embedding based on respective metadata of each of the plurality of processes of the process tree.

At block 1020, operations of the method 1000 may include processing the process tree embedding with a machine learning model to generate an identification of malware associated with the process tree. In some embodiments, the machine learning model may be similar to the identification model 275 described herein with respect to FIGS. 1 to 9. In some embodiments, the identification may be similar to and/or based on the classification 254 and/or the explanation 252 described herein with respect to FIGS. 1 to 9.

In some embodiments, processing the process tree embedding with the machine learning model to generate the identification of malware associated with the process tree may include processing the process tree embedding with the machine learning model to generate a classification of the process tree as being associated with malware; and, responsive to the classification indicating that the process tree is associated with malware, generating the identification of a first process of the plurality of processes that is relevant to the classification of the process tree as being associated with malware, generating, by a processing device, an identification of a first process of the plurality of processes that is relevant to the classification of the process tree as being associated with malware. In some embodiments, the classification may be similar to the classification 254 described herein with respect to FIGS. 1 to 9. In some embodiments, the identification of the first process may be based on the explanation 252 described herein with respect to FIGS. 1 to 9.

In some embodiments, the method 1000 may further include, responsive to the identification of malware associated with the process tree, initiating remediation on one or more of the plurality of processes of the process tree.

Figure 11:
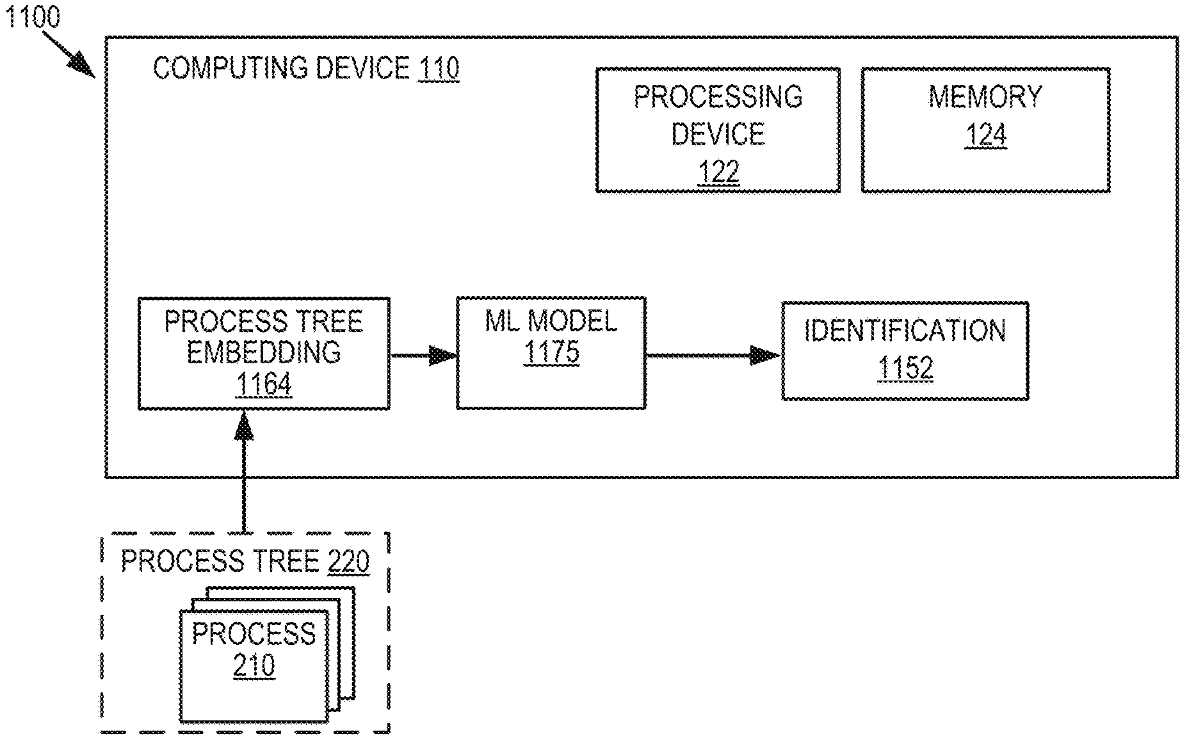
FIG. 11 is a c component diagram of an example of a device architecture for malware detection, in accordance with embodiments of the disclosure

FIG. 11 is a component diagram of an example of a device architecture 1100 for malware detection, in accordance with embodiments of the disclosure. The device architecture 1100 includes computing device 110 having processing device 122 and memory 124, as described herein with respect to FIGS. 1 to 10.

A process tree embedding 1164 may be generated that to a process tree 220. The process tree 220 may include a plurality of processes 210. In some embodiments, the process tree embedding 1164 and process tree may be similar to the process tree embedding 264 and/or the process tree 220 described herein with respect to FIGS. 1 to 10. In some embodiments, the plurality of processes 210 may be similar to the processes 210 described herein with respect to FIGS. 1 to 10.

The process tree embedding 1164 may be processed with a machine learning (ML) model 1175 to generate an identification 1152 of the process tree 220 as being associated with malware. In some embodiments, the ML model 1175 may be similar to the identification model 275 described herein with respect to FIGS. 1 to 10. In some embodiments, the identification 1152 may be based on the classification 254 and/or explanation 252 described herein with respect to FIGS. 1 to 10.

The device architecture 1100 of FIG. 11 provides an improved capability for malware detection. The device architecture 1100 allows for analysis and/or detection of malware based on process metadata and process tree comparison. By detecting a similarity of a particular process tree to other process trees that are associated with malware, a potentially problematic process may be detected without having to wait for damaging operations to occur. The device architecture 1100 may be able to detect malware based on the behavior and/or configuration of the processes and process tree, rather than relying on a scan or comparison of static executable images. Moreover, as described herein, the device architecture 1100 may be configured to provide a natural language explanation for a relevant process of the process tree that is responsible for the determination that the process tree is associated with malware. Thus, even if a particular process is executing the malware instructions, the device architecture 1100 may be able to identify other processes that are the root cause of the malware. The device architecture 1100 provides a technological improvement to the operation of typical computing devices in that it is able to identify malware more efficiently and does not require constant updates to maintain malware signatures, saving on processing resources and downtime.

Figure 12:
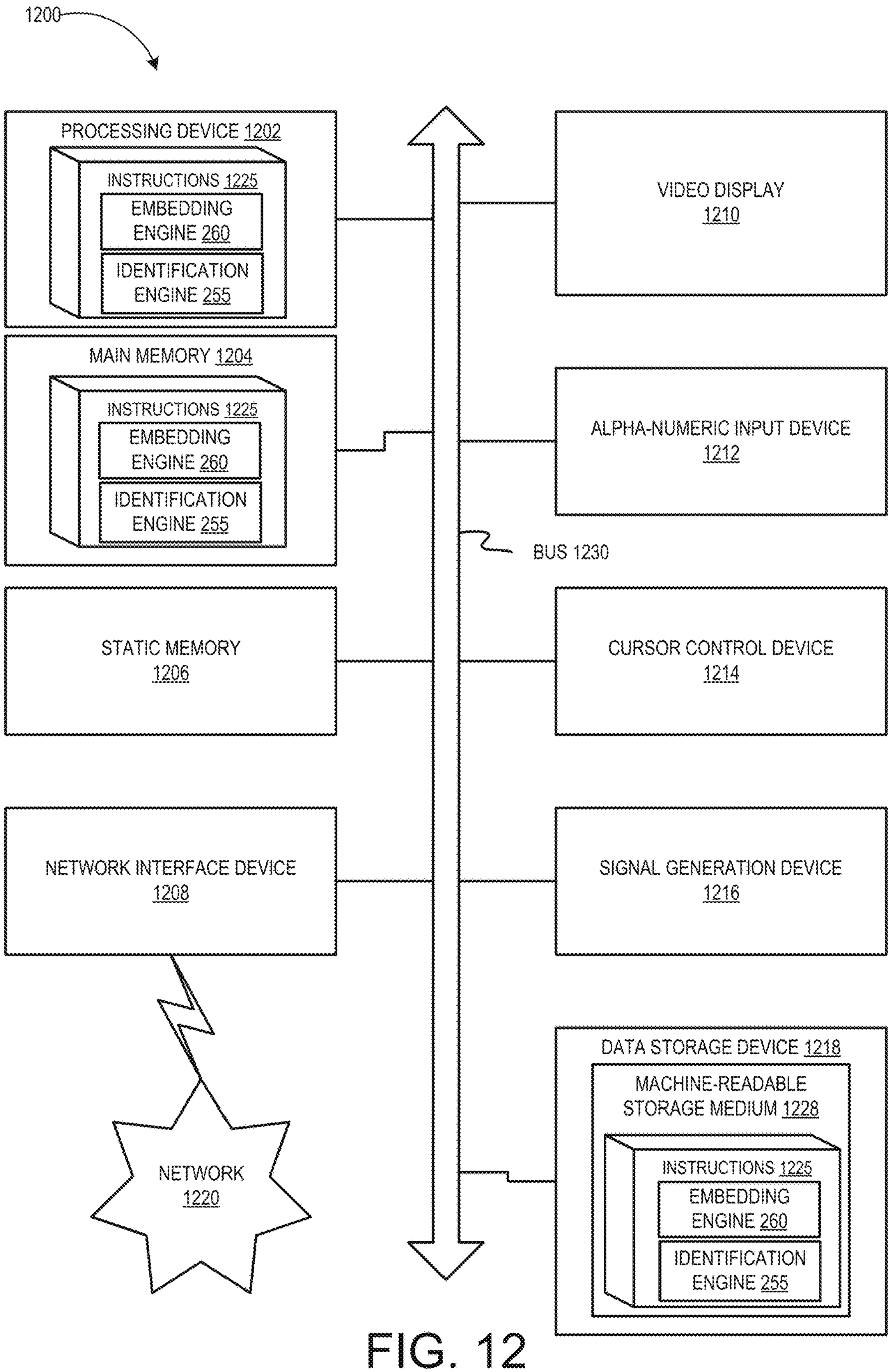
FIG. 12 is a block diagram of an example computing device that may perform one or more of the operations described herein, in accordance with embodiments of the disclosure.

FIG. 12 is a block diagram of an example computing device 1200 that may perform one or more of the operations described herein, in accordance with some embodiments of the disclosure. Computing device 1200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1200 may include a processing device (e.g., a general purpose processor, a PLD, etc.) 1202, a main memory 1204 (e.g., synchronous dynamic random access memory (DRAM), read-only memory (ROM)), a static memory 1206 (e.g., flash memory) and a data storage device 1218, which may communicate with each other via a bus 1230.

Processing device 1202 may be provided by one or more general-purpose processing devices such as a microprocessor, central processing unit, or the like. In an illustrative example, processing device 1202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 may also include one or more special-purpose processing devices such as an application specific integrated circuit (ASIC), a field programmable gate array (FPGA), a digital signal processor (DSP), network processor, or the like. The processing device 1202 may execute the operations described herein, in accordance with one or more aspects of the present disclosure, for performing the operations and steps discussed herein.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker). In one embodiment, video display unit 1210, alphanumeric input device 1212, and cursor control device 1214 may be combined into a single component or device (e.g., an LCD touch screen).

Data storage device 1218 may include a computer-readable storage medium 1228 on which may be stored one or more sets of instructions 1225 that may include instructions for an embedding engine 260 and/or a malware identification engine 255 for carrying out the operations described herein, in accordance with one or more aspects of the present disclosure. Instructions 1225 may also reside, completely or at least partially, within main memory 1204 and/or within processing device 1202 during execution thereof by computing device 1200, main memory 1204 and processing device 1202 also constituting computer-readable media. The instructions 1225 may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "processing," "aggregating," "submitting," "initiating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of detecting malware, the method comprising:
- generating a process tree embedding corresponding to a process tree, the process tree comprising a plurality of processes, wherein generating the process tree embedding comprises:
  - generating, for each of the plurality of processes, a respective process embedding based on metadata associated with that process; and
  - aggregating the respective process embeddings to generate the process tree embedding; and
- processing, by a processing device, the process tree embedding with a machine learning model to generate an identification of malware associated with the process tree, wherein the processing comprises:
  - identifying a target process, from the plurality of processes, that correspond to an execution associated with the malware;
  - identifying, from the plurality of processes, an ancestor process of the target process that is associated with spawning the target process; and
- producing, by the machine learning model a natural language explanation that describes, in human-readable terms, which one or more of the plurality of processes in the process tree are relevant in the identification of the malware, the natural language explanation identifying a comparative prioritization of which of the plurality of processes influence a classification of the process tree as being associated with the malware.

2. The method of claim 1, wherein processing the process tree embedding with the machine learning model to generate the identification of malware associated with the process tree comprises:
- processing the process tree embedding with the machine learning model to generate a classification of the process tree as being associated with malware; and
- responsive to the classification indicating that the process tree is associated with malware, generating, by the processing device, the identification of the ancestor process of the target process.

3. The method of claim 1, wherein generating the process tree embedding corresponding to the process tree comprises:
- generating a process embedding corresponding to a first process of the process tree; and
- generating the process tree embedding based on the process embedding.

4. The method of claim 3, wherein generating the process embedding comprises submitting metadata associated with the first process to a large language model (LLM).

5. The method of claim 4, wherein the metadata comprises at least one of an operating system process identifier (ID) of the first process, a unique generated process ID (UPID) of first process, an operating system process ID of an ancestor in the process tree of first process, a UPID of the ancestor in the process tree of the first process, a filename of an executable image of the first process, a command line used to create the first process, a filename of an executable image of the ancestor in the process tree of the first process, a command line of the ancestor in the process tree of the first process, or an identification of an action that caused a generation of the metadata for the first process.

6. The method of claim 1, wherein generating the process tree embedding corresponding to the process tree comprises:
- generating process embeddings for each of the plurality of processes of the process tree; and
- aggregating the process embeddings to generate the process tree embedding.

7. The method of claim 1, wherein generating the process tree embedding corresponding to the process tree comprises:
- generating the process tree embedding based on respective metadata of each of the plurality of processes of the process tree.

8. A system comprising:
- a memory; and
- a processing device, operatively coupled to the memory, to:
  - generate a process tree embedding corresponding to a process tree, the process tree comprising a plurality of processes, wherein the processing device is further to:
    - generate, for each of the plurality of processes, a respective process embedding based on metadata associated with that process; and
    - aggregate the respective process embeddings to generate the process tree embedding; and
  - process the process tree embedding with a machine learning model to generate an identification of malware associated with the process tree, the processing device further to:
    - identify a target process, from the plurality of processes, that correspond to an execution associated with the malware;
    - identify, from the plurality of processes, an ancestor process of the target process that is associated with spawning the target process; and produce a natural language explanation that describes, in human-readable terms, which one or more of the plurality of processes in the process tree are relevant in the identification of the malware, the natural language explanation identifying a comparative prioritization of which of the plurality of processes influence a classification of the process tree as being associated with the malware.

9. The system of claim 8, wherein, to generate the process tree embedding corresponding to the process tree, the processing device is to:

generate a process embedding corresponding to a first process of the process tree; and generate the process tree embedding based on the process embedding.

10. The system of claim 9, wherein, to generate the process embedding, the processing device is to submit metadata associated with the first process to a large language model (LLM).

11. The system of claim 10, wherein the metadata comprises at least one of an operating system process identifier (ID) of the first process, a unique generated process ID (UPID) of first process, an operating system process ID of an ancestor in the process tree of first process, a UPID of the ancestor in the process tree of the first process, a filename of an executable image of the first process, a command line used to create the first process, a filename of an executable image of the ancestor in the process tree of the first process, a command line of the ancestor in the process tree of the first process, or an identification of an action that caused a generation of the metadata for the first process.

12. The system of claim 8, wherein, to generate the process tree embedding corresponding to the process tree, the processing device is to:

generate process embeddings for each of the plurality of processes of the process tree; and aggregate the process embeddings to generate the process tree embedding.

13. The system of claim 8, wherein, to generate the process tree embedding corresponding to the process tree, the processing device is to:

generate the process tree embedding based on respective metadata of each of the plurality of processes of the process tree.

14. The system of claim 8, wherein the processing device is further to:

responsive to the identification of malware associated with the process tree, initiate remediation on one or more of the plurality of processes of the process tree.

15. A non-transitory computer-readable storage medium including instructions that, when executed by a processing device, cause the processing device to:

generate a process tree embedding corresponding to a process tree, the process tree comprising a plurality of processes, wherein the processing device is further to:

generate, for each of the plurality of processes, a respective process embedding based on metadata associated with that process; and aggregate the respective process embeddings to generate the process tree embedding; and process, by the processing device, the process tree embedding with a machine learning model to generate an identification of malware associated with the process tree, the processing device further to:

identify a target process, from the plurality of processes, that correspond to an execution associated with the malware;

identify, from the plurality of processes, an ancestor process of the target process that is associated with spawning the target process; and produce a natural language explanation that describes, in human-readable terms, which one or more of the plurality of processes in the process tree are relevant in the identification of the malware, the natural language explanation identifying a comparative prioritization of which of the plurality of processes influence a classification of the process tree as being associated with the malware.

16. The non-transitory computer-readable storage medium of claim 15, wherein, to generate the process tree embedding corresponding to the process tree, the processing device is to:

generate a process embedding corresponding to a first process of the process tree; and generate the process tree embedding based on the process embedding.

17. The non-transitory computer-readable storage medium of claim 16, wherein, to generate the process embedding, the processing device is to submit metadata associated with the first process to a large language model (LLM).

18. The non-transitory computer-readable storage medium of claim 15, wherein, to process the process tree embedding with the machine learning model to generate the identification of malware associated with the process tree, the processing device is to:

process the process tree embedding with the machine learning model to generate a classification of the process tree as being associated with malware; and responsive to the classification indicating that the process tree is associated with malware, generate the identification of the ancestor process of the target process.

19. The non-transitory computer-readable storage medium of claim 15, wherein, to generate the process tree embedding corresponding to the process tree, the processing device is to:

generate process embeddings for each of the plurality of processes of the process tree; and aggregate the process embeddings to generate the process tree embedding.

20. The non-transitory computer-readable storage medium of claim 15, wherein, to generate the process tree embedding corresponding to the process tree, the processing device is to:

generate the process tree embedding based on respective metadata of each of the plurality of processes of the process tree.

* * * * *